(12) United States Patent
Cyriac et al.

(10) Patent No.: US 8,819,129 B1
(45) Date of Patent: Aug. 26, 2014

(54) AUTO JOIN CONFERENCE

(75) Inventors: Shaiju Cyriac, Westminster, CO (US); Diana Messano D'Angelo, Broomfield, CO (US); Sreerupa Das, Arvada, CO (US); Bruce W. Hill, Broomfield, CO (US); William C. Leck, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1624 days.

(21) Appl. No.: 11/450,016

(22) Filed: Jun. 9, 2006

(51) Int. Cl.
G06F 15/16 (2006.01)
G06F 15/177 (2006.01)
G06F 15/173 (2006.01)

(52) U.S. Cl.
USPC .......... 709/204; 709/205; 709/206; 709/217; 709/218; 709/219; 709/220; 709/221; 709/222; 709/223; 709/224; 709/225; 709/226; 709/227; 709/228; 709/229

(58) Field of Classification Search
USPC .................................. 709/204–206, 225–226
See application file for complete search history.

(56) References Cited

U.S. PATENT DOCUMENTS

| | | | |
|---|---|---|---|
| 5,559,875 A | 9/1996 | Bieselin et al. | |
| 5,802,282 A | 9/1998 | Hales, II et al. | |
| 5,978,835 A | 11/1999 | Ludwig et al. | |
| 6,731,625 B1 * | 5/2004 | Eastep et al. | 370/352 |
| 6,915,331 B2 | 7/2005 | Fuller et al. | |
| 7,009,448 B2 | 3/2006 | Itakura et al. | |
| 7,277,697 B2 | 10/2007 | Desai et al. | |
| 7,317,791 B2 | 1/2008 | Carlson | |
| 2002/0095454 A1 * | 7/2002 | Reed et al. | 709/201 |
| 2004/0010548 A1 | 1/2004 | Hamilton et al. | |
| 2004/0034723 A1 * | 2/2004 | Giroti | 710/8 |
| 2005/0198140 A1 | 9/2005 | Itoh et al. | |
| 2006/0056614 A1 | 3/2006 | Chiu | |
| 2006/0062367 A1 | 3/2006 | Christenson et al. | |
| 2007/0071203 A1 * | 3/2007 | Boyer et al. | 379/158 |
| 2007/0117508 A1 * | 5/2007 | Jachner | 455/3.06 |
| 2007/0165554 A1 * | 7/2007 | Jefferson et al. | 370/315 |
| 2008/0205616 A1 | 8/2008 | Teng et al. | |

OTHER PUBLICATIONS

"Bigfoot Conference Call", available at http://images.bigfoot.com/images/bigfoot/cc/apr03/concall.pdf, pp. 1-3, archived May 13, 2005.
"Enhanced Audio Conferencing Features" available at http://its.ucsf.edu/services/audioconferencing/audio_conferencing_features.jsp, University of California, San Francisco, Last Updated Nov. 3, 2005, pp. 1-3.
Background section of the above-captioned application (previously provided).
U.S. Appl. No. 11/514,479, filed Aug. 31, 2006, Cyriac et al.

* cited by examiner

Primary Examiner — Tonia L Dollinger
Assistant Examiner — Clarence John
(74) Attorney, Agent, or Firm — Sheridan Ross P.C.

(57) ABSTRACT

The present invention provides methods and systems for automatically managing conference calls. More specifically, a user may join a conference call by calling a universal conference call number. The user is identified and connected with a specific conference call number without requiring the user to remember the specific conference call number.

25 Claims, 5 Drawing Sheets

| Identification Information | Person | Conferences | |
|---|---|---|---|
| •Employee Number XXXXXX •DOB •Company •Title •Biometric Data •Caller ID | John Smith | Monday | 11:00am Conference Room #1 |
| | | Tuesday | 1:30pm Conference Room #7<br><br>3:00pm Conference Room #4 |

*Fig. 3*

| Conferences | Facilitator | Participants | Bridge Number | Status |
|---|---|---|---|---|
| 11:00am Conference Room #1 | Judy Smith | Judy Smith John Smith Bill Smith | 6172974323 | Open |
| 1:00pm Conference Room #6 | | Jim Jones Tim Jones | 4192804271 | Closed |

*Fig. 4*

AUTO JOIN CONFERENCE

FIELD OF THE INVENTION

The invention relates generally to communication conferences like video and teleconferences. More particularly the invention relates to methods of automatically managing conference calls.

BACKGROUND OF THE INVENTION

Currently, audio and web based conferencing requires that the conference host and the conference participants join a conference using a unique participation code. The participants of the conference call into a central conference number where they are prompted to enter a unique participation code that allows them to participate in the conference. The unique participation code or participation code allows the user to connect to a switch or to a portion of a conference server (i.e., a conference bridge) processor that is dedicated to the conference. The dedicated portion of the processor or the switch creates a common connection between all participants in the conference that allows each participant to communicate with all other participants at the same time.

A unique participation code is used to restrict access to the conference and ensure its security. Since the unique participation code is used as a security measure, the unique participation code is typically a pseudo random collection of alphanumeric characters. Unless a participant knows the unique participation code to join a conference, the participant will not be able to connect to the dedicated portion of the server or the switch that is connecting all of the other participants.

The use of unique participation codes is an acceptable solution when a user is working in an office environment where he/she has access to the participation codes. The user may be scheduled for four conferences throughout the day, each conference having a unique participation code associated therewith. It is fairly simple for the user to keep track of each unique participation code in an office setting. For example, the user may have received invitations for the conference via email and the corresponding unique participation code for each conference may be embedded in those emails. As long as the user has access to the emails with the participation codes, then the user should have no problem joining each conference. However, if the user does not have access to the emails containing the participation codes then the user is required to write down or remember each participation code and further remember which participation code corresponds to which conference.

The problem associated with unique participation codes may also occur if the user somehow loses access to the emails containing the conference participation codes. A company's computer network and email servers are susceptible to failure. In the event that either the network or the email server fails, then a user will only be able to join a conference if he/she wrote the participation codes down somewhere else. Otherwise, the user will not be able to join the conference because the participation codes have been temporarily lost.

The inconvenience of participation codes has only been tolerated because of the security they provide for conference calls. However, due to the shortcomings associated with requiring a unique participation code for each conference, an alternative conference solution that still provides restricted access to conferences is desired.

SUMMARY OF THE INVENTION

These and other needs are addressed by various embodiments and configurations of the present invention. The present invention is directed generally to the use of a universal conference number or system. More specifically, the universal conference system automatically connects different users to their respective conferences without requiring the user to enter a unique participation code for each conference.

In accordance with one embodiment of the present invention, a method is provided for managing a conference. The method comprises the steps of:

(a) receiving a contact from a user at a server associated with a universal conference number;

(b) identifying the user;

(c) determining a conference that the user is scheduled to participate in; and (d) connecting the user to the conference.

As used herein a "conference" includes both audio and visual conferences. Examples of a conference include, but are not limited to, videoconferences, teleconferences, web conferences, and the like. Some users may participate in the same conference using a number of different media depending upon the functionality of the telecommunications device.

Users are connected to a specific conference though identification of the user. Since a user is identified and then assigned to a conference, the necessity of assigning each conference a unique participation code is eliminated. The user no longer has to remember a unique participation code to participate in the conference. Rather, the user only needs to be able to identify him/herself to the server and the server will automatically connect the user to a scheduled conference if one is available. The user can connect to any conference using any type of telecommunication device. The user does not need to be connected to the conference with a telecommunication device having certain features or certain access permissions. The identification of the user at a central location allows the user to participate in a conference from the location of his/her choice, whether the location is in an office, at home, roaming on a cell phone, or on a payphone on the street.

A user may be identified in a number of ways. For example, a user may carry an identification card (i.e., a radio frequency identification (RFID) card, a magnetic stripe card, optical scanning card, or other type of proximity card) that contains some information that can be used to identify the user. When the user is within an active zone of a telecommunication device equipped to read data from the identification card, the data may be read and stored by the telecommunication device for subsequent transmission when the user contacts the universal conference number.

An active zone is essentially a two or three-dimensional space surrounding the telecommunication device where the intensity of RF signals (in the event that the identification card is an RFID card) emitted by the telecommunication device exceeds a threshold of sensitivity of the RFID card and the intensity of RF signals emitted by the RFID card exceeds a threshold of sensitivity of the telecommunication device. Alternatively, an active zone for a magnetic stripe card is the area where the magnetic card needs to be passed across a magnetic reader on the telecommunication device such that the telecommunication device can read data from the magnetic card.

Collecting a user's biometric data presents another way that a user can be identified. Biometric data may be collected by a number of mechanisms including, but not limited to, retinal scans, voice recognition, fingerprint analysis, facial feature recognition, and the like. The amount of information gathered from the telecommunication device depends upon the capabilities of the telecommunication device.

Alternatively, the user may wish to participate using a simple telecommunication device that is incapable of identifying the user. If this is the case, the user simply calls the universal conference number and then identifies him/herself to the server by answering one or more questions or by inputting an identification number that is "unique" to the user. In that case, the user only needs to remember one identification number to be identified by the server and subsequently connected to a conference instead of remembering a unique participation code for each conference.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

FIG. 3 is a diagram depicting a first data structure employed in accordance with embodiments of the present invention;

FIG. 4 is a diagram depicting a second data structure employed in accordance with embodiments of the present invention;

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to identify a user then connect the user to a conference based on his/her identity.

Figure 1:
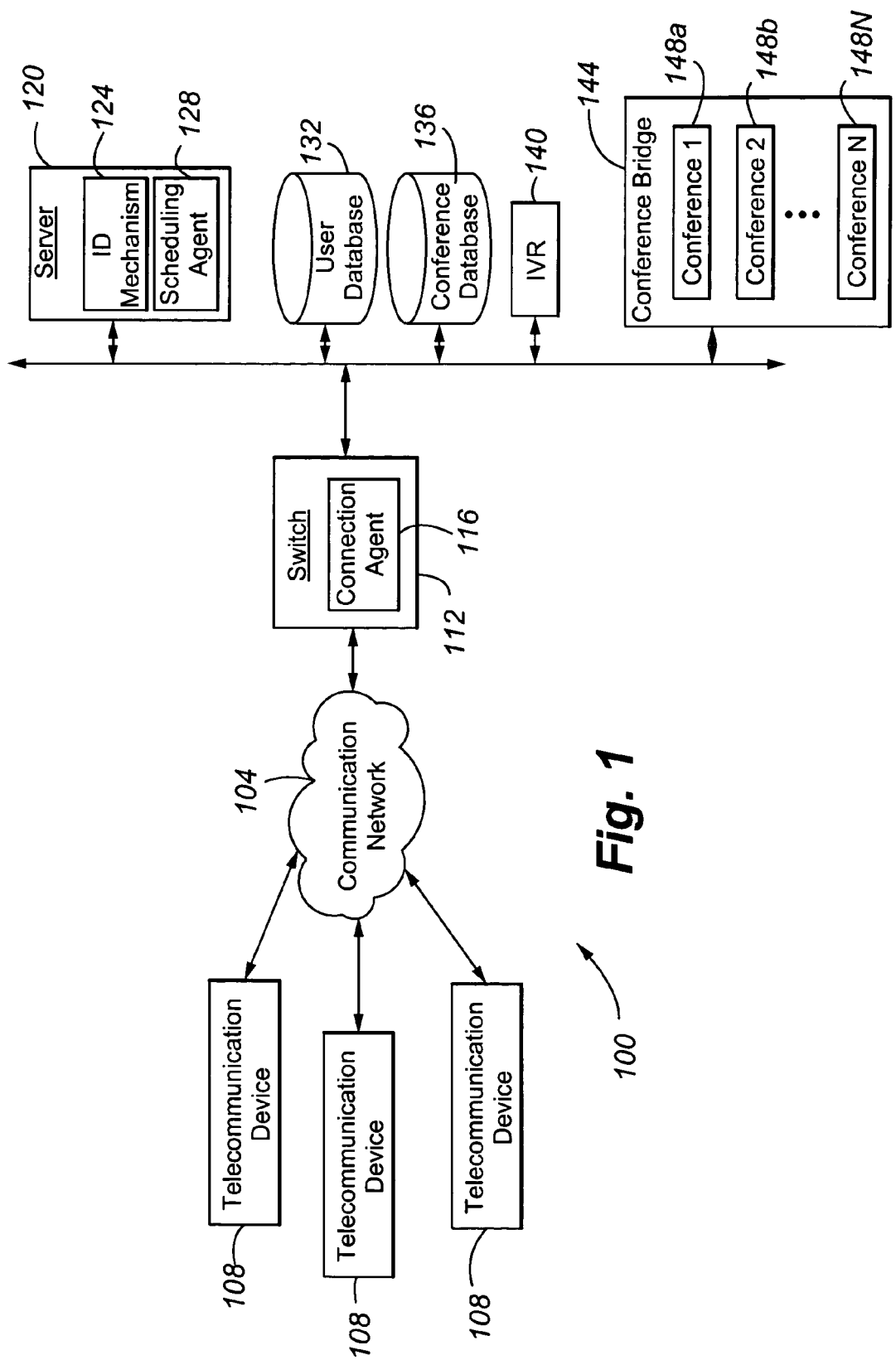
FIG. 1 is a block diagram of a communication system in accordance with embodiments of the present invention.

Referring initially to FIG. 1 an exemplary communication system 100 will be described in accordance with at least some embodiments of the present invention. The communication system 100 comprises a communication network 104 connecting a plurality of telecommunication devices 108 to a Private Branch Exchange (PBX) server 112. The switch 112 comprises a connection agent 116 and is in communication with a server 120 comprising an ID mechanism 124 and a scheduling agent 128, a user database 132, a conference database 136, an Interactive Voice Response unit (IVR) 140, and a conference bridge 144. The telecommunication devices 108 can be any of a number of packet-switched or circuit-switched devices including, without limitation, analog phone, digital phone, Personal Computer (PC), laptop, Personal Digital Assistant (PDA), IP hardphone, IP softphone, wireless phone, cellular phone, hearing impaired communication equipment like a tty device, video equipment, and networking equipment.

The network 104 may be any type of suitable communications network that is operable to transmit data from one communication endpoint to another endpoint, where typical endpoints include the communication devices 108, the switch 112, the server 120, the IVR 140, and the conference bridge 144. Examples of suitable types of communication networks 104 include, but are not limited to, a standard Plain Old Telephone System (POTS), an Integrated Services Digital Network (ISDN), a Public Switched Telephone Network (PSTN), a Local Area Network (LAN), a Wide Area Network (WAN) like the Internet, and any other type of packet-switched or circuit-switched network known in the art.

The switch 112 is associated with a universal conference number and receives contacts from the telecommunication devices 108 that have dialed the universal conference number. The switch 112 comprises a connection agent 116 that routes different contacts to different conferences depending upon the identity of a user associated with the telecommunication device 108.

When the switch 112 receives a contact, the connection agent 116 determines if any user information has been sent along with the contact. The user information may include user name, user location, employee number, user identification number, biometric data, user birthday, and caller identification number. The telecommunication device 108 may be able to automatically provide some user information to the connection agent 116.

In the event that additional user information is required to identify the user, the switch 112 connects the IVR 140 to the telecommunication device 108. When connected to the telecommunication device 108, the IVR 140 is operable to prompt the user to answer different questions. The answers to the questions presented by the IVR 140 can be used to help identify the user more accurately. For example, the IVR 140 may prompt the user to enter his/her birthday, age, gender, employee badge number, mother's maiden name, first pet's name, favorite color, and so on.

User information that is received with the contact or recovered during an interaction with the IVR 140 is forwarded from the switch 112 to the server 120. The server 120 comprises an ID mechanism 124 and a scheduling agent 128. Upon receipt of the user information from the switch 112, the ID mechanism 124 references the user database 132 in an attempt to identify the user. The ID mechanism 124 may simply compare a received user employee number with a list of employee numbers in the user database 132. The name or identity corresponding to the received employee number is found by the ID mechanism 124 and given to the scheduling agent 128.

The scheduling agent 128 references the conference database 136 and compares the user identity to a list of users permitted access to various conferences listed in the conference database 136. If the scheduling agent 128 determines that the identified user is permitted access to a conference and that conference is open, then the scheduling agent 128 determines the location of the subject conference. The scheduling agent 128 sends the location of the subject conference back to the switch 112.

The switch 112 connects the user to the identified conference on the conference bridge 144. The conference bridge 144 comprises a number of conference areas 148a-N, where N is typically greater than or equal to one. Each conference area 148 represents a portion of the conference bridge 144 that is dedicated to the scheduled conference. The dedicated portion of the conference bridge 144 may comprise a dedicated portion of a processor within the conference bridge 144 or a dedicated switch in the conference bridge 144 depending upon the type of conference bridge 144 that is being employed.

As can be appreciated by one of skill in the art, the switch 112 does not necessarily need to reside in the same location as any of the other system 100 elements. Furthermore, a single switch 112 may coordinate and assign contacts to a number of different conference bridges 144 residing in various locations. Moreover, a single conference bridge 144 may be assigned different contacts from different switches 112.

As can be further appreciated by one of skill in the art, the server 120 may reference multiple databases to identify a user and determine what, if any, conferences the user is assigned to participate in. The databases may be located within the same enterprise as the server 120 or may be dispersed among numerous enterprises. However, a conference bridge 144 generally has a conference database 136 associated therewith maintaining the schedule of conferences for the given conference bridge 144.

The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

As can be appreciated the invention does not require any particular type of information transport medium between switch or server and telecommunication devices, i.e., the invention may be implemented with any desired type of transport medium as well as combinations of different types of transport media.

It should be emphasized that the configuration of the server, user telecommunication devices, and other elements as shown in FIG. 1 is for purposes of illustration only and should not be construed as limiting the invention to any particular arrangement of elements.

Figure 2:
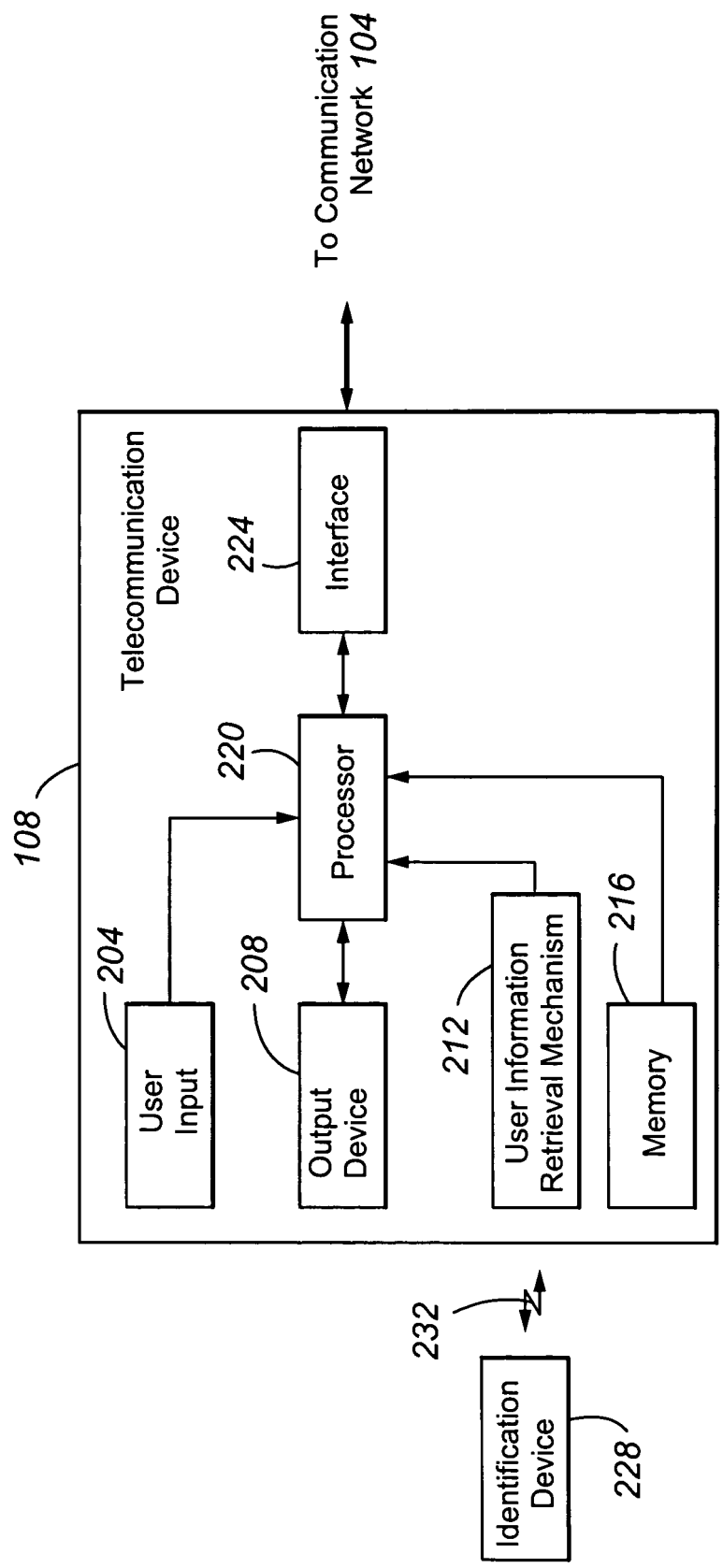
FIG. 2 is a block diagram depicting an enhanced telecommunication device in accordance with embodiments of the present invention.

Referring now to FIG. 2, a telecommunication device 108 will be described in accordance with at least some embodiments of the present invention. The depicted telecommunication device 108 comprises a user input 204, an output device 208, a user information retrieval mechanism 212, a memory 216, a processor 220, and an interface 224. The telecommunication device 108 comprises the typical functionality of a plain old telephone or PC (i.e., the ability to send and receive contacts) via a communication network 104.

The user input 204 may include, without limitation, a keyboard/keypad, a mouse, a microphone or other type of voice transducer, a speech to text engine, and a video camera. The user input 204 functions to collect data from the user and transmit the received data to the processor 220. If the collected data is to be transmitted across the communication network 104, the processor 220 will package the information for transmission, if necessary, and forward the data on to the interface 224 for transmission across the communication network 104.

The output device 208 is operable to display information to the user. Data received at the interface 224 from the communication network 104 is transmitted to the processor 220, which subsequently forwards the data on to the output device 208 for presentation to the user. The displayed data may be audio, visual, printed, or a combination thereof. The output device 208 may include, without limitation, a speaker, a Light Emitting Diode (LED) or collection of LEDs, an LCD display, a projection screen, a plasma screen, a beeper, or any other device capable of presenting data to a user of the telecommunication device 108.

The processor 220 is capable of performing predetermined functions that may be stored in memory 216. The processor 220 controls the functionality of the telecommunication device 108 and further processes incoming and outgoing data according to transmission protocols of the communication network 104. The processor 220 may be embodied as a microprocessor or similar type of processing chip. Alternatively, the processor 220 may include an Application Specific Integrated Circuit (ASIC), a programmable logic device (PLD), or a field programmable gate array (FPGA).

The interface 224 serves as the connection between the telecommunication device 108 and the communication network 104. The form of the interface 224 may vary depending upon the type of communication network 104 and telecommunication device 108. The interface 224 may include a modulation/demodulation unit for modulating data to be sent across the communication network 104 and demodulation data received from the communication network 104. The interface 224 may comprise, without limitation, a standard telephone interface, a modem, an Ethernet port and Ethernet card, a wireless interface, and so on. The protocols used to communicate with the communication network 104 may include known wired and/or wireless communication protocols.

The memory 216 is operable to store functions for the processor 220 to execute along with other information including, phone extension information, caller identification information, and user information. The memory 216 may include volatile and/or non-volatile memory. Examples of a suitable type of memory 216 include, but are not limited to, Random Access Memory (RAM), Dynamic RAM (DRAM), Read Only Memory (ROM), Erasable Programmable ROM (EPROM), Electrically Erasable PROM (EEPROM), buffered memory, Flash memory, and the like.

As noted above, the telecommunication device 108 may be equipped with a user information retrieval mechanism 212. The user information retrieval mechanism 212 is operable to automatically retrieve and determine user information, sometimes without requiring the user to interact with the telecommunication device 108. The user information retrieval mechanism 212 may be equipped to communicate with an identification device 228 via a communication interface 232 when the identification device 228 is presented to the telecommunication device 108.

The communication interface 232 may be a wireless communication interface implementing wireless communication methods like near field RF communications, far field RF communications, surface acoustic wave communication, and so on. The communication interface 232 may also be a magnetic or optical communication interface.

In one embodiment, the user information retrieval mechanism 212 may include an RFID reader. The RFID reader can scan the area around the telecommunication device 108 searching for RFID cards that it can communicate with. When the RFID reader detects the presence of an RFID card, the RFID reader attempts to initiate a communication session with the RFID card. If the RFID card is enabled to communicate with the RFID reader, then data is transmitted between the RFID card and reader.

The RFID reader may ultimately recover some amount of user information that was stored on the RFID card (i.e., employee identification number, user name, and other information that can be used to identify the user). When the user information retrieval mechanism 212 recovers any user information, the recovered information is forwarded to the processor 220 that subsequently stores the user information in memory 216. The user information can be kept in the memory 216 for a predetermined amount of time, for as long as the user is within proximity of the telecommunication device 108, or indefinitely. When the telecommunication device 108 sends a contact to the switch 112, the telecommunication device 108 may also send the user information stored in the memory 216 to the switch 112.

In an alternative configuration, the user information retrieval mechanism 212 may only attempt to retrieve user information upon the transmission of a contact to the switch 112. After the contact has been sent, the user information retrieval mechanism 212 begins scanning for an identification device 228 or the user is prompted to present an identification device 228 to the telecommunication device 108. If the user presents the identification device 228 to the telecommunication device 108, then the information retrieval mechanism 212 begins to pull user information from the identification device 228.

In accordance with alternative embodiments of the present invention, the user information retrieval mechanism 212 comprises a biometric reader capable of recovering a user's biometric data. The information retrieval mechanism 212 may include facial features scanning technologies, voice recognition technologies, fingerprint analysis technology, retinal scanning technologies, bar codes, and so on. The information retrieval mechanism 212 does not necessarily need to be able to determine a user's identity based on his/her biometric data. Rather, the user information retrieval mechanism 212 simply collects the biometric data and sends such data to the switch 112. The switch 112 forwards the biometric data to the server 120, where the ID mechanism 124 is operable to analyze the biometric data and determine the user's identity.

Referring now to FIG. 3, a data structure for a particular user 300 will be described in accordance with at least some embodiments of the present invention. The depicted data structure 300 may be stored in one or more of the databases 132 and/or 136 that the server 120 can access. The user data structure 300 comprises an identification information field 304, a person field 308, and a conferences field 312. The identification information field 304 holds information that can be used to identify the particular user. Different parameters may be used alone or in combination to determine the identity of a user. For example, biometric user information like a user's fingerprint or a user's voice characteristics may be used to identify a user. In the event that the user cannot be uniquely identified by his/her biometric data, then other information including employee number and the like may be used.

Once enough user information is available to uniquely identify the user, the person field 308 is populated with the identity of the person. As can be appreciated, a unique identification number may simply be used to refer to the user, but a name is used herein for purposes of illustration. By uniquely identifying the user, the server 120 can then construct the user's conference schedule 312. The user conference schedule field 312 comprises the date, time, and conference area 148 that a conference is scheduled to take place. The information in the user conference schedule field 312 may be updated when one of the participants reschedules the conference using Outlook® or a similar type of scheduling software. The server 120 uses the information in the user conference schedule field 312 to determine if the identified user is allowed access to any conferences. A user may not be allowed access to a conference in the event that he/she contacted the switch 112 too early prior to the conference. Also, a user may not be allowed access to a conference if he/she was not invited to attend the conference and therefore is not listed as an invited participant.

Referring now to FIG. 4, a conference access data structure 400 will be described in accordance with at least some embodiments of the present invention. The scheduling agent 128 references the conference access data structure 400 to determine the access permissions associated with a particular conference and the location of that conference. The conference access data structure 400 comprises a conference location field 404, a facilitator field 408, a participant field 412, a bridge number field 416, and a status field 420. The conference location field 404 contains the conference time and corresponding conference area 148.

A single person may have scheduled the conference and that originating party may be granted administrative permissions to the conference. For example, the originating party may be the only participant that is allowed to change the conference time or the list of invited participants. Of course, a conference would not have an originator if a number of people scheduled the conference collectively. Also, the conference may not have a facilitator in the event that the originating party waived his/her administrative privileges.

The list of participants 412 contains the name or identification information of each participant that has been invited to the subject conference. The users that are listed in the list of participants 412 are allowed to access the conference and will be connected to the conference when they contact the switch 112. A user that has not been invited to the conference either by the facilitator or by some other participant will not be allowed access to the conference. The list of invited participants provides a layer of security that traditionally came with the distribution of a unique participation code to invited participants. However, since the list of invited users is maintained in the database 132 and/or 136, each user is not required to remember a unique participation code.

The bridge number field 416 contains the bridge number or participation code that was historically sent to each invited participant. The bridge number field 416 provides the number or identification of the location of the conference area 148 to the switch 112. The switch 112 connects the user to the conference area 148 when provided with the bridge number 416. As can be appreciated, identifying the conference area 148 (e.g., conference area #4), the conference area 148 may be accessed. However, if a number of different conference bridges 144 are being accessed by a single switch 112, then the conference bridge number serves to more easily identify the conference area 148 than would a reference to a conference bridge number 144 and the conference area 148 within the conference bridge 144.

The conference status field 420 operates to restrict access according to the current time and the time when a contact is received. It is useful to restrict access to invited participants because otherwise invited participants may be inadvertently connected to a conference that is in the right conference area 148 but is at a different time. The restrictions of access helps ensure that invited attendees connect only to the conference they are invited to and to not interfere with other conferences. When the switch 112 receives a contact the contact is time-stamped with the receipt time. As the server 120 determines the access permission of the user it also determines if the user is invited to a conference that is open. In accordance with embodiments of the present invention, the conference is opened a slight time before the scheduled beginning of the conference to accommodate for a user who might call in a few minutes early. Additionally, the conference will remain open as long as individuals are still participating in the conference.

This allows a user to join the conference at a time after the scheduled beginning of the conference. Once the conference has been terminated, i.e., all of the participants have disconnected from the conference area 148, the conference status is changed to closed and the conference information is purged from the database 132 and/or 136. If a user contacts the switch 112 and there are no conferences that the user is currently scheduled to attend, the user is notified that no conferences are available and is asked to contact the switch 112 at a later time or is provided with an option to connect to a conference operator or simply hang up. The user may be given his/her respective conference schedule and may be told when to contact the switch 112 to connect to his/her next scheduled conference. Also, the user may be allowed to reschedule a conference if he/she has administration permissions.

As can be appreciated, there may be times when a user is scheduled to participate in more than one conference at substantially the same time. In the event that the user contacts the switch 112 and the server 120 has identified a conflict, the user will be prompted to resolve the conflict (i.e., choose one of the conflicting conferences to participate in, merge the conferences, etc.). After the user has resolved the conflict, the status of the non-chosen conference will remain open while the user is connected to the chosen conference. By keeping the user on the invited participants list for the non-chosen conference, the user is able to join the non-chosen conference after he/she is finished with the chosen conference. The user can be automatically switched from one conference to another after the chosen conference has been terminated if the non-chosen conference is still open. If the non-chosen conference has also been terminated, then the user will be notified and can be given his/her conference schedule for the rest of the day, week, etc.

It should be noted that both of the data structures 300 and 400 or portions of both data structures 300 and 400 may reside on a common database. Alternatively, the server 120 may reference multiple databases to construct the data structures 300 and/or 400.

Figure 5:
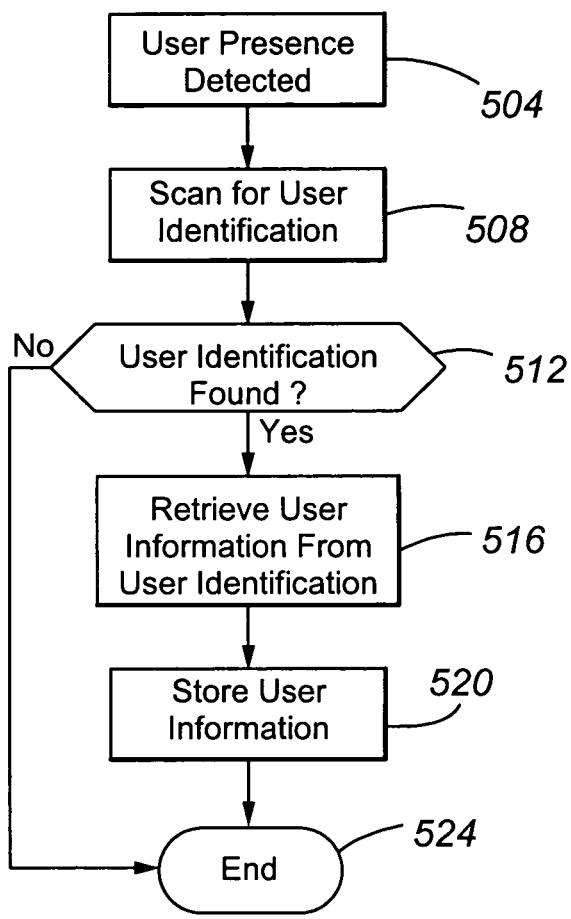
FIG. 5 is a flow chart depicting a method of automatically gathering user information in accordance with embodiments of the present invention.

Referring now to FIG. 5 a method for recovering user data will be described in accordance with at least some embodiments of the present invention. The method begins with the telecommunication device 108 optionally detecting the presence of a user or at least the presence of a user's identification device 228 (step 504). The presence of a user may be detected by the use of a motion sensor, vibration sensor, accelerometer, or the like. When the presence of a user is detected, the area surrounding the telecommunication device 108 is scanned for a user identification device 228 (step 508). The presence of an identification device 228 may be detected by intermittently or continuously transmitting prompting signals into an area around the telecommunication device 108. As can be appreciated by one of skill in the art, the telecommunication device 108 may transmit prompting signals without detecting the presence of a user. When the identification device 228 receives one of these prompting signals it answers back with a reply signal.

Upon receipt of the reply signal the telecommunication device 108 can determine if the user information retrieval mechanism is equipped to retrieve data from the identification device 228 (step 512). In the event that the user information retrieval mechanism 212 is operable to retrieve data from the identification device 228, the information retrieval mechanism 212 begins a communication session with the identification device 228. During the communication session the information retrieval mechanism 212 retrieves user information from the user identification device 228 (step 516). The information retrieved from the identification device 228 can include employee identification numbers and other unique identifiers, company the user is employed by, department where the user works, security access permissions, date of birth, and so on. The telecommunication device may also prompt the user to speak to or interact with the information retrieval mechanism 212 such that biometric data can be retrieved from the user.

The received information is sent from the user information retrieval mechanism 212 to the processor 220. The processor 220 may then transmit the user information to the switch 112 if a contact is being placed or has been placed with the switch 112. Alternatively, the processor 220 sends the user information to the memory 216 where it is stored for later submission (step 520). The user information may be retained in memory 216 for a predetermined amount of time before it is purged from memory. Alternatively, the user information may be retained in memory 216 until the user leaves the presence of the telecommunication device 108. Further in the alternative, the user information may be stored in memory indefinitely if the telecommunication device 108 is the primary telecommunication device used by the subject user. As can be appreciated, user information for a number of different users may be stored in the memory 216, although it is advantageous to purge user information when a user leaves the telecommunication device 108 in an attempt to conserve available memory space. In the event that no user identification device 228 was found or after the user information has been stored in memory 216, the method ends at step 524.

Figure 6:
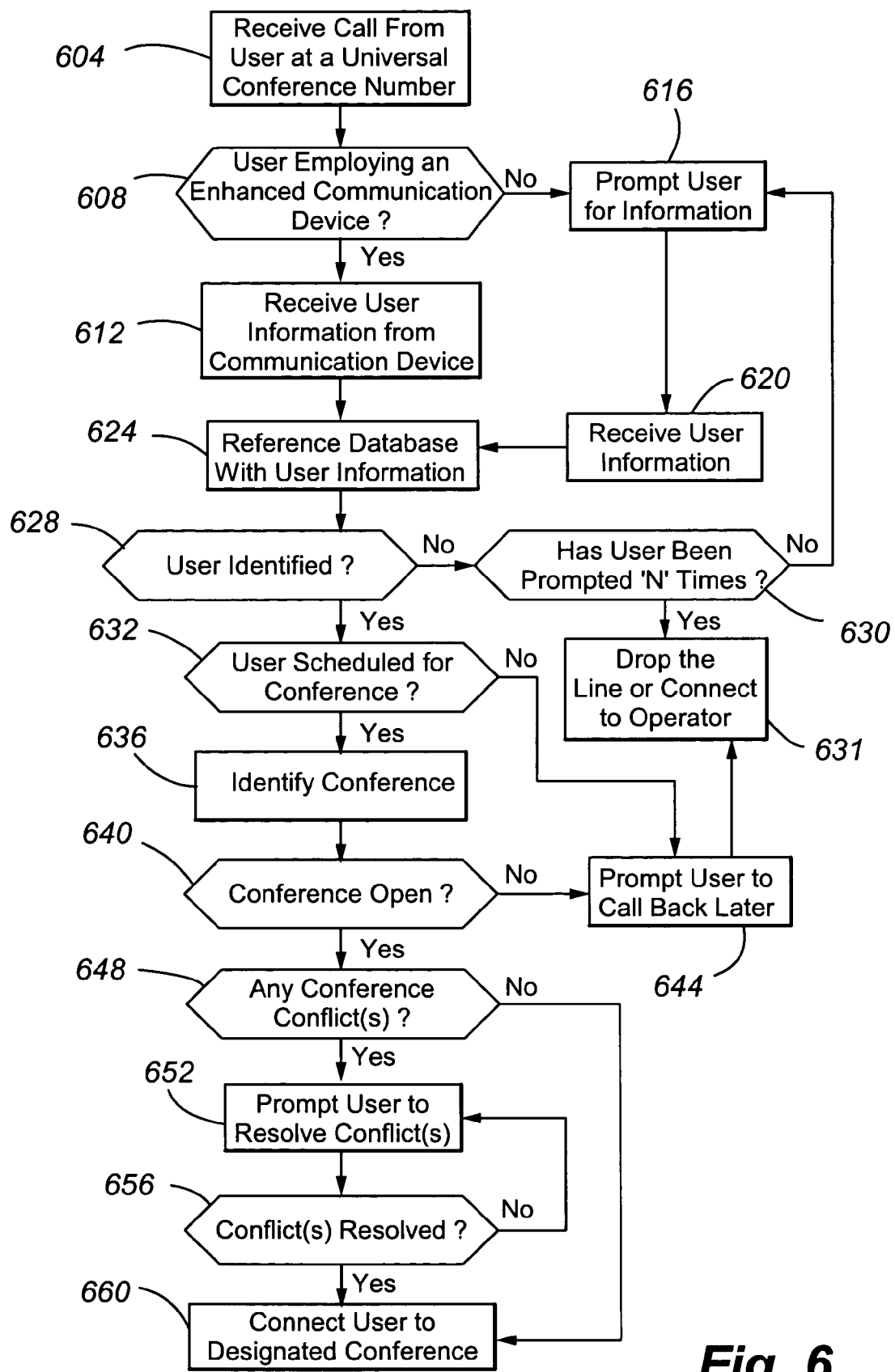
FIG. 6 is a flow chart depicting a method of managing conference calls in accordance with embodiments of the present invention.

Referring now to FIG. 6, a method of managing a conference will be described in accordance with at least some embodiments of the present invention. The method begins when a contact, typically in the form of a call, is received at a universal conference number (step 604). The contact may be received at the switch 112 associated with the universal contact number. When the contact is received, the switch 112 places the contact on hold while it is determined how to manage the incoming contact.

After the call has been placed on hold it is determined if the user was employing an enhanced telecommunication device (step 608). An enhanced telecommunication device is any type of device that is capable of determining some amount of information about a user. For example, an enhanced telecommunication device may comprise an information retrieval mechanism 212. Alternatively, an enhanced telecommunication device may be able to transmit caller identification information to the switch 112. If the user is employing an enhanced communication device, then user information is received from the telecommunication device 108 at the time the contact is received or shortly thereafter (step 612).

The type of user information transmitted with the contact may be as simple as caller ID information. The caller ID simply identifies what telecommunication device 108 was used to contact the switch 112. If there is only one person permitted access to use the subject telecommunication device 108, then the user can be uniquely identified by the caller ID information. However, if more people are permitted access to the telecommunication device 108, then the caller ID information may not be able to uniquely identify the user. Of course, the type of user information transmitted with the contact may be more complex information like biometric data or a unique participant identification number.

In the event that the user is not employing an enhanced telecommunication device, then the IVR 140 prompts the user for information (step 616). The prompt may ask the user to speak into the user input 204 or enter an employee identification number. The prompt is essentially asking the user to identify him/herself so that he/she can be connected to the proper conference. The server 120 receives user information as the user responds to the prompts issued by the IVR 140 (step 620). Since the user can be asked about his/her user information, the need for a user to contact the switch 112 with a certain type of telecommunication device is eliminated. Instead, a user may call in from a home phone or connect to a conference from a laptop at a local coffee shop.

Once some amount of user information has been received, either directly from the telecommunication device or through prompting by the IVR 140, the server 120 references the database with user information (step 624). As noted above, when searching for the identity of the user, the server 120 may reference a number of different databases, which may or may not be located within the same enterprise as the server 120.

After the server 120 has referenced the requisite databases, it is determined if the user has been uniquely identified (step 628). In other words, it is determined if there was an adequate amount of user information provided to the server 120 to identify the user. In the event that the server 120 was unable to uniquely identify the user, it is determined if the user has been prompted 'N' times, where N is a threshold of prompts that should not be exceeded by the IVR 40 (step 630). If the user has been prompted N times, then the line will be dropped or the user is connected to a conference operator (step 631). In the event that the user has not been prompted N times, then the method returns to step 616 for the IVR 140 to prompt the user for more information that may be useful in uniquely identifying the user. However, in the event that the server 120 was able to uniquely identify the user, the server 120 checks to see if the identified user is scheduled for a conference (step 632). If the user contacts the switch 112 on a day when he/she is not scheduled to participate in a conference, then it may be determined that the user is not scheduled for a conference. If the user is not scheduled to attend a conference, the user is prompted to contact the universal contact number at a later time (step 644) and is further given the option of connecting to the operator or simply hanging up (step 631). As the user is prompted to contact the universal contact number later, the user may also be reminded of his/her upcoming conference schedule for later days when the user is invited to join a conference.

In the event that the user is scheduled for a conference, for example on the day the user has contacted the central conference number, then the conference(s) that the user is scheduled to participate in is determined (step 636). Each of the identified conferences may be sorted according to scheduled starting time or according to availability. After the conference schedule for the user has been identified, it is determined if any of the conferences are open (step 640). During this step, the server 120 compares the time the contact was received to a scheduled starting time of the next conference the user is invited to. If the time stamp of the user contact is within a threshold of the scheduled starting time (i.e., if the conference is opened fifteen minutes before the scheduled beginning of the conference and the user contacted the switch 112 ten minutes before the scheduled beginning of the conference) then the conference can be considered open. Alternatively, the status of the conferences may be maintained as a separate data field and the server 120 checks the status data field 420 to determine the availability of conferences for the identified user. If the user is not invited to an open conference, the user may also be prompted to contact the universal contact number at a certain time corresponding to an opening time for a conference the user is scheduled to participate in. For example, if the next conference for a user is not scheduled to open for another thirty minutes, the user may be prompted to contact the switch 112 in thirty minutes or so.

If the user is scheduled to attend at least one open conference, then it is determined whether there are any conference conflicts (step 648). The conflicting conferences may be the next conferences the user is scheduled to participate in. Alternatively, the conflicting conferences may be other conferences that are scheduled for later in the day.

In the event that any conflict(s) is identified, the user is prompted to resolve the conflict(s) (step 652). The user may be asked to resolve a conflict between currently open conferences. Additionally, if other conflicts are identified at a later time, the user may also be prompted to resolve the conflicts. The user may be asked to choose one of the conflicting conferences that he/she would like to participate in. Alternatively, if the user has permission to alter conferences, the user may be given the option of merging the conferences. Regardless, the user is prompted to resolve the conflict such that the user is connected to a single conference, whether that single conference is one conference chosen from the conflicting conferences or a combined conference.

In step 656, it is determined if the user has resolved the conflict(s). In the event that the conflicts have not been resolved, the method returns to step 652 where the user is further prompted to resolve the conflicts. Of course, the user may only need to resolve the immediate conflicts and is not required to resolve conflicts that are scheduled for a later time. However, it is advantageous to have the user resolve as many conflicts as possible when the user contacts the switch 112.

After the conflict(s) have been resolved, or in the event that no conflicts were identified, the user is connected to the designated conference (step 660). As noted above, the designated conference may be the chosen conference from the conflicting conferences or the designated conference may simply be the open conference that the user is scheduled to participate in. During this step, the server 120 sends the information to the switch 112 indicating the location of the designated conference. The switch 112 receives the location of the conference and removes the contact from hold and connects the contact with the location of the conference The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for managing a conference call at a server associated with a universal conference number, comprising:
   receiving, at the server, a contact from a participant of a conference call;
   searching, at a conference database, user identification information and information related to a plurality of scheduled conferences, the plurality of scheduled conferences being accessible via a publically available universal conference number;
   identifying the participant by analyzing participant data unique to the participant;
   in an absence of requiring a user to enter a unique participation code for a particular conference call corresponding to one of the plurality of scheduled conferences, determining a conference from among the plurality of scheduled conferences that the participant is scheduled to participate in based on the participant data unique to the participant; and
   connecting the participant to the determined conference.

2. The method of claim 1, further comprising:
   allocating at least one of a dedicated portion of a conference server and a dedicated switch to support the conference that the participant is scheduled to participate in; and
   rerouting the received contact to at least one of the dedicated portion of the conference server and the dedicated switch.

3. The method of claim 1, wherein participant data unique to the participant includes one or more of (i) a card ID associated with the participant, (ii) biometric data of the participant, and (iii) an answer to a personal question asked of the participant, and wherein identifying the participant comprises:
   receiving participant information;
   referencing a database comprising a plurality of participant identities; and
   comparing the participant information to the plurality of participant identities to determine the identity of the participant.

4. The method of claim 3, further comprising:
   prompting the participant for participant information; and
   receiving a response to the prompt from the participant.

5. The method of claim 3, further comprising:
   a telecommunication device detecting the presence of a participant within proximity of the telecommunication device;
   scanning for an identification device that contains participant information;
   determining that an identification device containing participant information is within proximity of the telecommunication device;
   retrieving participant information from the identification device; and
   sending the participant information to the universal conference number with the contact.

6. The method of claim 5, wherein the identification device comprises at least one of a radio frequency identification (RFID) device, a magnetic stripe card, and a barcode.

7. The method of claim 3, wherein participant information comprises at least one of user name, user location, employee number, user identification number, biometric data, user birthday, and caller identification number.

8. The method of claim 1, wherein determining a conference comprises:
   identifying the time that the contact was received;
   referencing a database comprising information related to a plurality of scheduled conferences;
   determining that the participant is permitted access to at least one of the plurality of scheduled conferences;
   determining an open time for the at least one scheduled conference the participant is permitted access to;
   comparing the time the contact was received with the open time for the at least one scheduled conference the participant is permitted access to; and
   determining that the contact was received within the open time.

9. The method of claim 8, wherein the open time comprises a predetermined amount of time prior to a scheduled beginning of the conference the participant is permitted access to and an amount of time that at least one participants is involved in the conference.

10. The method of claim 1, wherein the conference is identified automatically from a participant identification number.

11. The method of claim 1, further comprising:
    determining that the participant is scheduled to participate in at least two conferences that conflict with one another;
    prompting the participant to resolve the conflict between scheduled conferences; and
    connecting the participant to one of the at least two conflicting conferences based upon the participant's response to the prompt.

12. A non-transitory computer readable medium having stored thereon executable instructions operable to perform the method of claim 1.

13. A system for managing a conference, comprising:
    a database comprising user identification information and information related to a plurality of scheduled conferences, the plurality of scheduled conferences being accessible via a universal conference number; and
    a server operable to receive a contact from at least one telecommunication device along with user information, the user information uniquely identifying a user of the at least one telecommunication device, compare the user information received from the at least one telecommunication device with the user identification information in the database to identify the user and determine, in an absence of requiring the user to enter a unique participation code for a particular conference, at least one conference from among the plurality of scheduled conferences the user is scheduled to participate in, and further thereafter connect the user to the at least one conference the user is scheduled to participate in.

14. The system of claim 13, wherein the server is associated with a universal conference number.

15. The system of claim 13, wherein the conference is allocated at least one of a dedicated portion of a conference server and a dedicated switch and the server is operable to reroute the received contact to at least one of the dedicated portion of the conference server and the dedicated switch.

16. The system of claim 13, wherein participant data unique to the participant includes one or more of (i) a card ID associated with the participant, (ii) biometric data of the participant, and (iii) an answer to a personal question asked of the participant, and wherein the server is further operable to determine the identity of the user by comparing the received user information to the user identification information in the database.

17. The system of claim 13, wherein the server is further operable to prompt the user for user information, receive a response to the prompt from the user, and determine user information based on the response to the prompt.

18. The system of claim 13, wherein the telecommunication device is operable to detect the presence of a user within proximity of the telecommunication device, scan for an identification device that contains user information, determine that an identification device containing user information is within proximity of the telecommunication device, retrieve user information from the identification device, and send the user information to the server with the contact.

19. The system of claim 18, wherein the identification device comprises at least one of a radio frequency identification (RFID) device, a magnetic stripe card, and a barcode.

20. The system of claim 13, wherein user information comprises at least one of user name, user location, employee number, user identification number, biometric data, user birthday, and caller identification number.

21. The system of claim 13, wherein the server is further operable to identify the time that the contact was received, determine that the user is permitted access to at least one of the plurality of scheduled conferences, determine an open time for the scheduled conference the user is permitted access to, and compare the time the contact was received with the open time for the scheduled conference the user is permitted access to.

22. The system of claim 21, wherein the open time comprises a predetermined amount of time prior to a scheduled beginning of the conference the user is permitted access to and an amount of time that at least one participants is involved in the conference.

23. The system of claim 13, wherein the server is further operable to determine that the user is scheduled to participate in at least two conferences that conflict with one another, prompt the user to resolve the conflict between scheduled conferences, and connect the user to one of the at least two conflicting conferences based upon the user's response to the prompt.

24. The system of claim 13, wherein the server is further operable to prompt the user for additional user-specific information in response to failing to recognize the user information.

25. The system of claim 13, wherein at least one telecommunication device is connected to the server via one or more of: a plain old telephone system (POTS) and a public switched telephone network (PSTN).

\* \* \* \* \*